United States Patent [19]

Stumpe

[11] Patent Number: 5,720,534
[45] Date of Patent: Feb. 24, 1998

[54] METHOD AND APPARATUS FOR DETERMINING THE APPLICATION PRESSURE OF A VEHICLE BRAKING SYSTEM

[75] Inventor: Werner Stumpe, Stuttgart, Germany

[73] Assignee: Robert Bosch GmbH, Stuttgart, Germany

[21] Appl. No.: 596,259

[22] PCT Filed: Jun. 19, 1995

[86] PCT No.: PCT/DE95/00782

§ 371 Date: Feb. 8, 1996

§ 102(e) Date: Feb. 8, 1996

[87] PCT Pub. No.: WO96/01757

PCT Pub. Date: Jan. 25, 1996

[30] Foreign Application Priority Data

Jul. 9, 1994 [DE] Germany ............... 44 24 270.0

[51] Int. Cl.$^6$ ...................................... G06F 7/70
[52] U.S. Cl. ...................................... 303/166; 364/426.01
[58] Field of Search ................... 303/166, 174, 303/177; 364/426.01, 426.02, 426.03

[56] References Cited

U.S. PATENT DOCUMENTS

| 3,718,374 | 2/1973 | Ochia | 303/166 |
| 4,414,630 | 11/1983 | Harris | 303/166 |
| 4,811,993 | 3/1989 | Matsumoto | 303/166 |

FOREIGN PATENT DOCUMENTS

| 0588193 | 12/1994 | European Pat. Off. . |
| 4112845 | 10/1992 | Germany . |
| 4206238 | 9/1993 | Germany . |
| 4206240 | 9/1993 | Germany . |
| 4230911 | 3/1994 | Germany . |
| 4310422 | 7/1994 | Germany . |

Primary Examiner—Robert J. Oberleitner
Assistant Examiner—C. T. Bartz
Attorney, Agent, or Firm—Felfe & Lynch

[57] ABSTRACT

A process and a device for determining the application pressure of a brake mechanism for a vehicle are proposed, where a measure of the pressure in the brake system and a measure of the rotational speed of at least one of the wheels to be braked are detected, and where the time of application of the brake mechanism and thus its application pressure are derived from the change over time in this rotational speed.

16 Claims, 6 Drawing Sheets

METHOD AND APPARATUS FOR DETERMINING THE APPLICATION PRESSURE OF A VEHICLE BRAKING SYSTEM

STATE OF THE ART

The invention pertains to a method and to an apparatus for determining the application pressure of a braking mechanism for vehicles by maesuring pressure in the mechanism and measuring the rotational speed in at least one of the wheels to be braked.

A process and a device of the type is question are known from DE 41 12 845 A1. In the compressed air brake system described in that document, the application pressure of the individual wheel brakes is determined by evaluation of the change in pressure over time during the actuation of the brake. The application pressure thus determined is used to correct the nominal pressure derived from the driver's command for the individual wheel brakes with the goal of producing the same braking force at all the wheels of the vehicle or at all the wheels of one axle. As a result, influences attributable to wear, variations in the coefficient of friction, mechanical losses, and tolerances at the individual wheel brakes are compensated. To determine the application pressure, the increase in pressure over time during a brake actuation is detected; and, upon recognition of an inflection, the brake pressure then prevailing is stored as the application pressure. As another way of determining the application pressure, a distance sensor can be used to determine the distance traveled by the piston rod of a brake cylinder. The pressure value which is present when an inflection occurs in the curve of the distance traveled by the piston rod versus time is then stored as the application pressure. The additional distance sensor for detecting the brake application pressure improves the accuracy of the determination of the application pressure, because the time-pressure curve depends strongly on the actuation of the nominal value transmitter by the driver. This distance sensor nevertheless represents another sensor for the brake system, a sensor which, furthermore, is actuated directly by the braking pressure.

The state of the art offers various methods and devices for determining the application pressure. These methods and devices determine the application pressure either on the basis of the pressure-time curve upon actuation and release of the brake or by the use of an additional distance sensor. Such methods and devices are described in DE 42 06 238 A1, DE 42 06 240 A1, and DE 42 30 911 A1.

SUMMARY OF THE INVENTION

The object of the invention is to improve the accuracy with which the application pressure of a braking mechanism in a vehicle is determined.

According to the invention, the change over time of the measured rotational speed is determined, and the application or release of a brake is determined based on the change over time. Based on the detected pressure when the brake is applied or released, an application pressure is determined, which is used to correct the nominal pressure derived from the driver's command.

The procedure according to the invention improves the way in which the application pressure is determined in electronically controlled brake systems, including electrical, electro-pneumatic, and electro-hydraulic brake systems, regardless of whether drum brakes or disk brakes are present. It is especially advantageous to use the braking pressure during the pressure release phase to determine the application pressure. Because the pressure medium is escaping during the pressure release phase, the conditions for evaluating the pressure curve are more stable than they are during the pressure buildup phase.

Determining the application pressure from pressure values which are obtained during both the pressure buildup and the pressure release phase is especially advantageous. In this case it is advantageous to determine the hysteresis which is present and to take this hysteresis into account in the determination of the application pressure.

Particular advantages are to be derived from implementing the process according to the invention in conjunction with the use of a proportional valve as a control valve for controlling the braking pressure. Because the signal which actuates the valve is proportional to the braking pressure, there is no need to measure the pressure. A measure of the braking pressure and thus of the application pressure can be determined from the magnitude of the actuating signal.

Using the velocity of a wheel or of the vehicle to determine the time of application and thus the application pressure value brings special advantages. Using the velocity makes it possible to determine the time of application more precisely, especially when the acceleration and/or the second derivative of the wheel velocity with respect to time is used to determine the time of application. These advantages are obtained because the velocity of the wheel or of the vehicle does not depend directly on the pressure in the brake system but rather manifests the effects of changes in pressure only indirectly. In addition, there is no need to install any additional sensors, because speed sensors would normally be present in any case as part of the antilock function of the brake system.

The procedure according to the invention can also be used in any electronically controlled brake system, even if the system is controlled by purely electrical means and even if an additional emergency brake circuit is present.

Additional advantages can be derived from the following description of exemplary embodiments.

DESCRIPTION OF THE EXEMPLARY EMBODIMENTS

Figure 1:
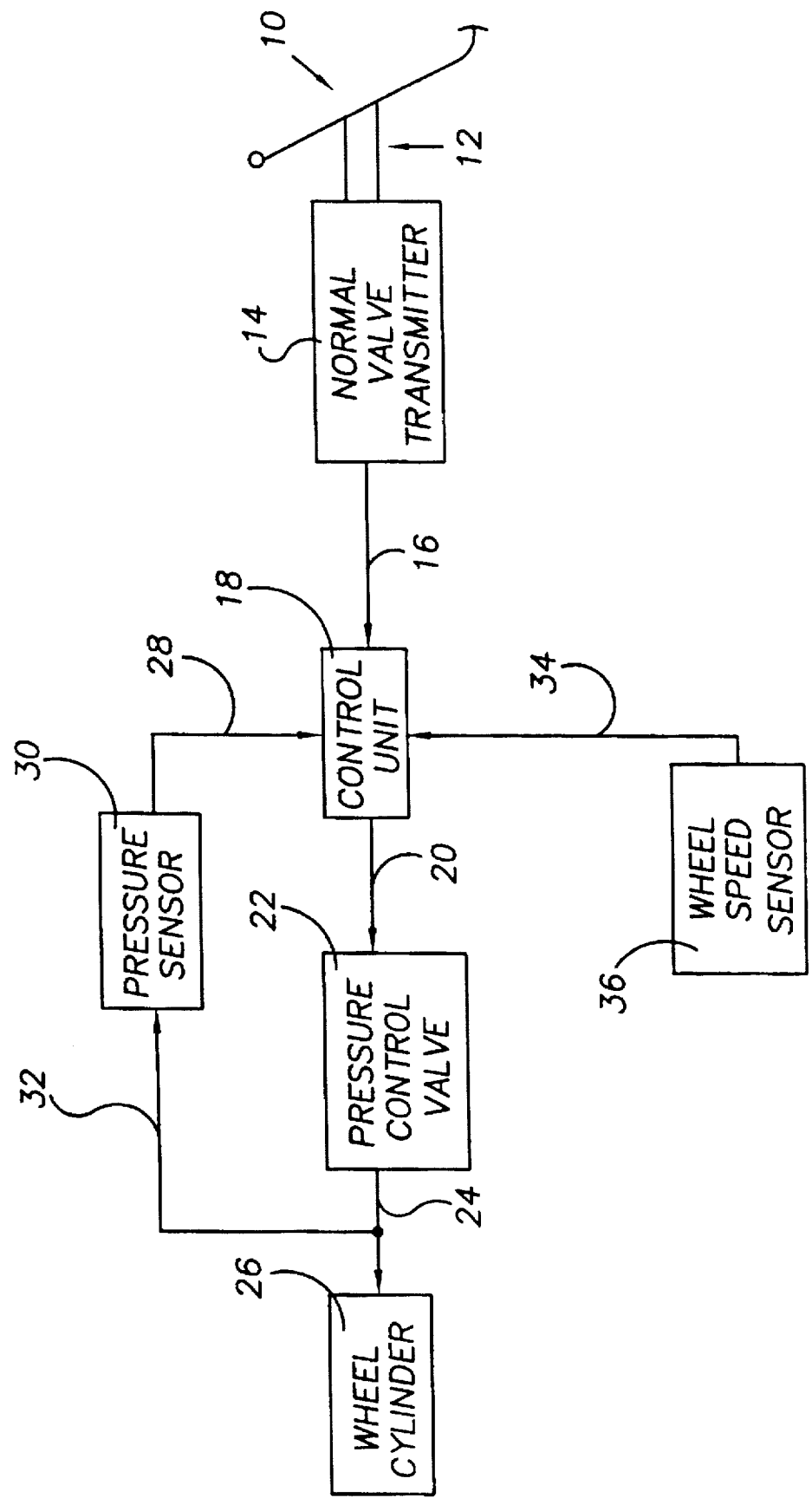
FIG. 1 shows an overall block circuit diagram of an electronically controlled brake system, based on the example of one wheel.

FIG. 1 shows an overall block circuit diagram of an electrically or electronically controlled brake system as known from the state of the art described above. A brake pedal 10 is connected by way of a mechanical joint 12 to an electric and pneumatic or hydraulic nominal value transmitter 14. From this transmitter, a connecting line 16 leads to an electrical control unit 18, which has the job of controlling the brake system electrically. From electrical control unit 18 a connecting line 20 leads to a control valve 22 of the pneumatic or hydraulic section of the brake system or to an electrical servo device of an electrical brake system. This valve can be a magnetic switching valve such as that normally used in such cases or a proportional valve, which adjusts the pressure in the wheel brake cylinder assigned to the valve in correspondence with the drive signal on line 20. The valve can also take the form of servo motors or servo magnets. This is shown in FIG. 1 by line 24 leading from valve 22 to wheel brake cylinder 26 of a wheel brake (not shown). A connecting line 28, furthermore, leads to control unit 18 from a sensor 30, which detects the braking pressure in the area of valve 22 or brake cylinder 26 (line 32). In addition, a line 34 from a sensor 36 for detecting the velocity of the wheel (not shown) also leads to control unit 18. For reasons of clarity, the hydraulic or pneumatic brake circuit which is provided in these types of electrically controlled brake systems to guarantee the braking function in the event that control unit 18 fails is not shown. If a proportional valve is used as valve 22, sensor 30 for detecting the brake pressure can be omitted, and a measure of the brake pressure can be derived from the drive signal of the proportional valve. The same is true of the drive signals in cases where the servo device is motor-driven or magnetic.

When brake pedal 10 is actuated by the driver, an electrical position value is sent by nominal value transmitter 14 to electrical control unit 18. The control unit uses characteristic curves, tables, or diagrams to convert this value into nominal braking pressure values for the individual wheel brakes. Control unit 18 then actuates valve 22, which determines the pressure in the wheel brake cylinder, in correspondence with the nominal pressure value being specified for the wheel brake in question. When a proportional valve is used, the nominal pressure is produced by exact specification of the drive signal sent to the valve; or, when conventional magnetic switching valves are used, the brake pressure detected by sensor 30 is adjusted to match the nominal pressure value. As already described above, the goal is to achieve not only uniform wear on the brake linings but also the simultaneous onset and uniform intensity of the braking action at all the wheels of the vehicle or at least at all the wheels on the same axle of the vehicle. For this purpose, a characteristic curve of the braking force versus the nominal braking pressure is stored in control unit 18 for each wheel brake. A nominal pressure at which the brake makes contact, that is, the pressure at which the exerted braking force just begins to differ from zero and a drive signal is generated for the assigned valve, is assigned to each wheel brake. This so-called "application pressure" is usually different for each wheel brake and changes during the service life of the motor vehicle. The measures according to the invention described below serve to determine this application pressure value, which leads to a corresponding adjustment of the characteristic curve.

The rotational speed or velocity of the wheel is used to determine this application pressure. In a preferred exemplary embodiment, the velocity of the wheel is determined by means of a sensor with a toothed ring. This toothed ring has specially marked-out teeth, which generate defined signal pulses, which are detected by the control unit. To determine the rotational speed of the wheel, the time interval (N) between these defined signal pulses is determined by means of a counter, which operates at a constant clock frequency. The angular velocity and its derivatives with respect to time can then be calculated from this time interval by finding the reciprocal.

In other advantageous exemplary embodiments, other methods for detecting the rotational speed such as the counting of pulses within a fixed period of time are used as part of the process according to the invention.

In an advantageous exemplary embodiment, the rotational speed values are averaged to eliminate random variations, and these averaged signal values are used to determine the application time of the brake.

Figure 2A:
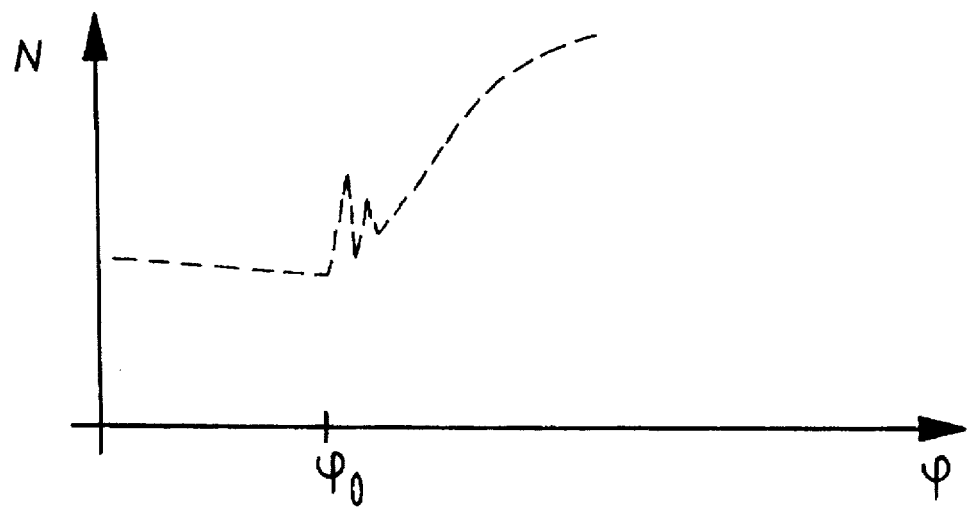
FIG. 2 shows typical signal curves of the wheel velocity signal at the beginning and at the end of braking.
Figure 2B:
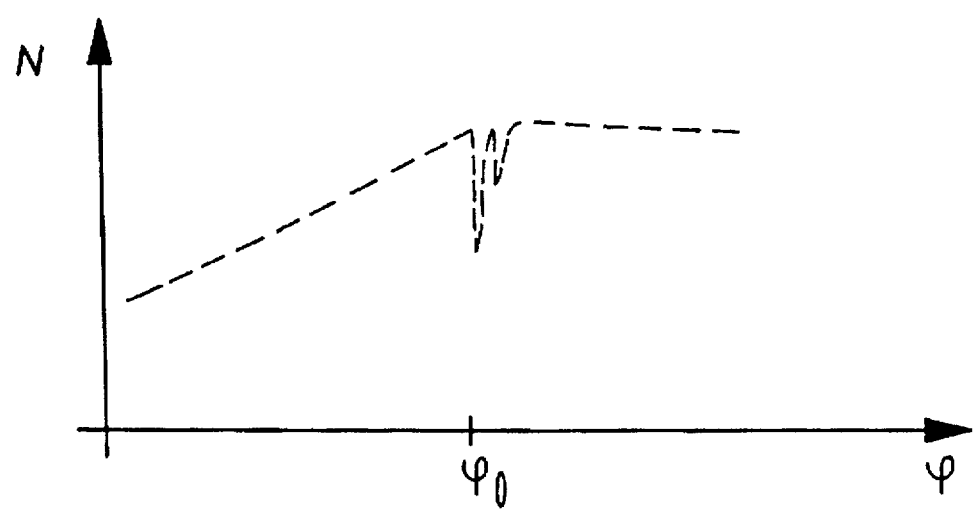

FIGS. 2a and 2b show typical signal curves of the rotational speed signal versus the angle of rotation of the wheel, i.e., versus time. FIG. 2a shows the situation upon actuation of the brake, FIG. 2b the situation upon release of the brake. In each case the pulse number N is plotted on the vertical axis, whereas the rotational angle $\phi$ of the wheel (or the time) is plotted on the horizontal axis.

As long as the brake is not being actuated (see angle of rotation smaller than $\phi_0$), the wheel is in a free-rolling state, in which it is either being accelerated or slightly decelerated by resistances such as friction, a rise in the road, or a retarder. This driving condition is therefore characterized by a relatively continuous curve for the rotational speed of the wheel. This continuous curve is disturbed briefly by the action of the brake at angle $\phi_0$; (time $t_0$). The reason for this brief disturbance is an additional problem with the interaction between the brake and the road caused by the play of the brake components and by the behavior of air-filled, profiled tires. In other words, the curve of the rotational speed of the wheel (see angle of rotation $\phi_0$) is disturbed in a characteristic manner upon application of the brake. When the brake is applied, the vehicle decelerates quickly; the number N shown in FIG. 2a increases sharply; and the rotational speed of the wheel decreases. A similar behavior is observed when the brake is released. In FIG. 2b, a braking process is shown at rotational angles of less than $\phi_0$, in which the wheel velocity decreases sharply, and accordingly the number N increases. At time $t_0$, the brake is released, that is, the applied brake components lose contact. Here, again, a characteristic disturbance can be observed in the course of the speed curve as a result of the factors indicated above. After the brake has been released, the wheel is again in a free-rolling state, which is characterized by an essentially flat speed curve at rotational angles greater than $\phi_0$. In the process of determining the application pressure, evaluating this characteristic speed curve during the actuation of the brake and shortly thereafter makes it possible to obtain an accurate value for the application pressure both when the brake is actuated and the pressure is building up and also when the brake is released and the pressure is decreasing.

Figure 3A:
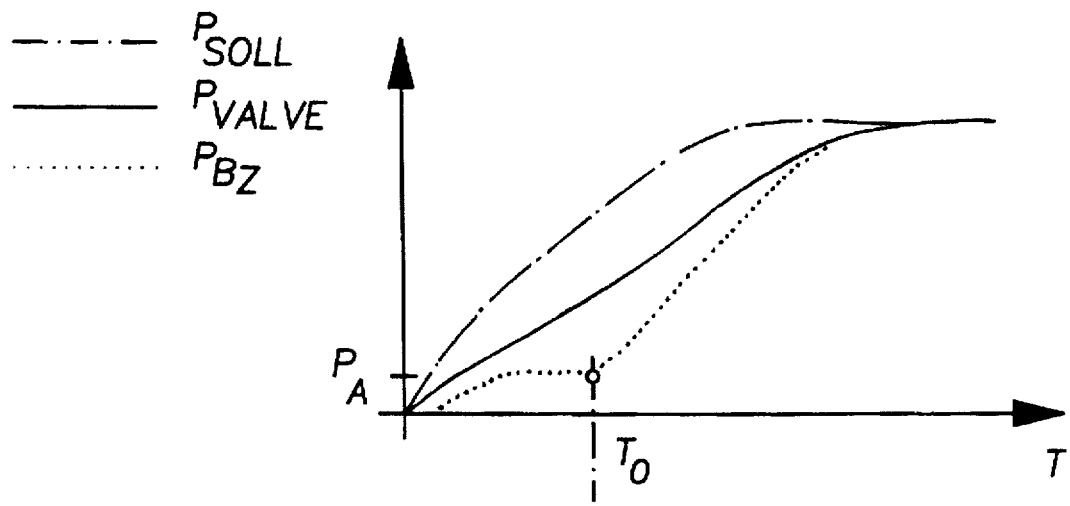
FIGS. 3 and 4 show typical signal curves during the pressure buildup and pressure release phases, respectively, as a function of time and the corresponding curves of the wheel velocity, i.e., the first and second derivatives with respect to time.
Figure 3B:
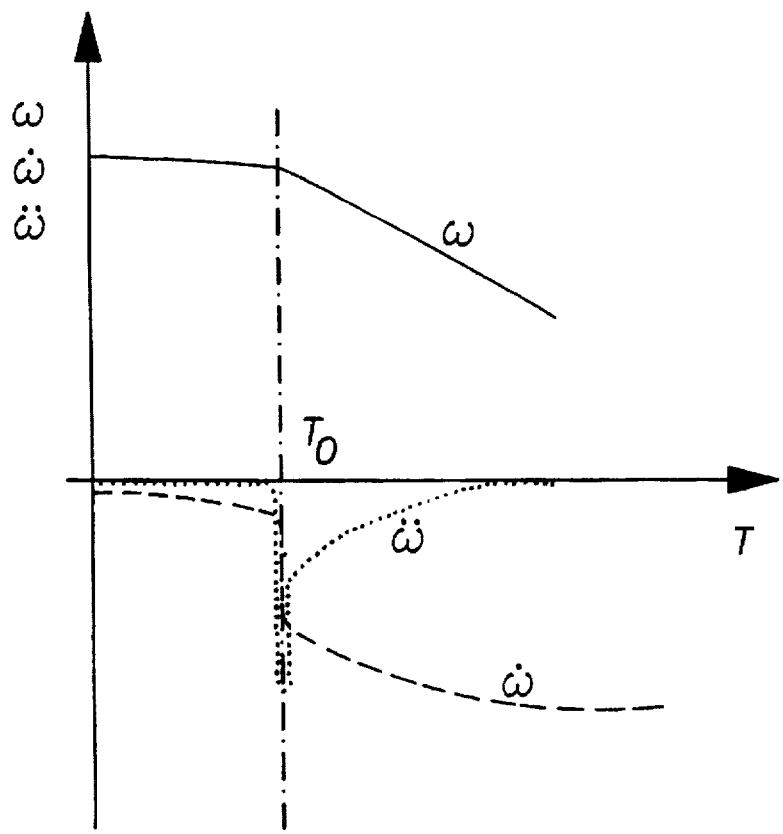

The process according to the invention for detecting the application pressure can be illustrated most effectively on the basis of characteristic brake pressure curves and the associated rotational speed curves. Accordingly, FIG. 3a shows characteristic pressure-versus-time curves for the brake command ($P_{soll}$, dash-dot line), the pressure at the control valve ($P_{valve}$, solid line), and the pressure in the brake cylinder ($P_{Bz}$, dotted line). For comparison, FIG. 3b shows the speed-versus-time curve of the wheel ($\omega$, solid line), the first derivative with respect to time of the wheel speed ($d\omega/dt$, broken line), and the second derivative with respect to time of the wheel speed ($d^2\omega/dt^2$, dotted line). The first derivative of the wheel speed with respect to time represents the rotational acceleration of the wheel, whereas the second derivative of the speed with respect to time represents the jerk induced by the application of the brake. FIG. 3 represents here the situation which occurs when the brake is actuated, that is, the phase during which the pressure is building up.

The rate at which the pressure builds up depends essentially on how the nominal value transmitter is actuated (see the brake command curve). When the brake pedal is actuated, there is no pressure in the brake cylinder at first. Air therefore flows from the supply tank to the brake cylinder very quickly because of the high pressure gradient. If the brake pressure is detected at a point remote from the brake cylinder, e.g., at the control valve, the time curve obtained is different from that obtained in the brake cylinder itself (see solid and dotted lines). The air entering the brake cylinder is compressed to the pressure level which corresponds to the resistances acting on the brake cylinder piston. As soon as this point is reached, the piston starts to travel outward, and the air gap in the brake is overcome by the brake actuating mechanism. This outward travel of the piston occurs as the pressure continues to increase. Even after the friction brake has made contact, pressure medium continues to flow into the brake cylinder. The braking pressure thus continues to increase. The associated speed-versus-time curve for the wheel 15 shown in FIG. 3b. When the brake is applied at time $t_0$, the speed of the wheel decreases quickly. The first derivative of the wheel speed with respect to time shows the characteristic, discontinuous course (in broken line), whereas the second derivative with respect to time shows a maximum at time $t_0$. Evaluation of the speed curve, of the first derivative with respect to time, and/or of the second derivative with respect to time makes it possible to determine time $t_0$ exactly, i.e., the time at which the brake makes contact. The pressure present at time $t_0$ in the brake cylinder is then stored as the application pressure $P_A$.

Figure 4A:
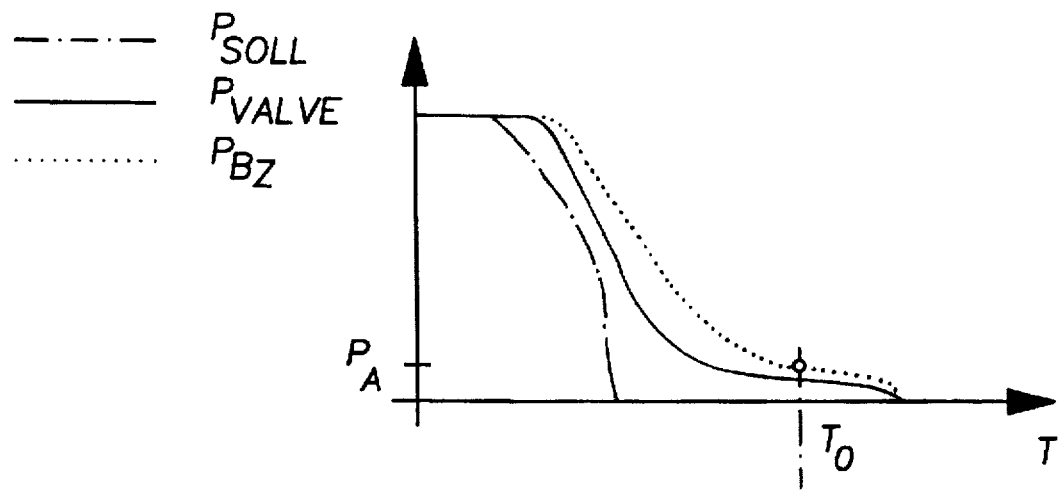

When the brake is actuated, the rate at which it is actuated has a considerable effect on the determination of the application pressure. Conditions for the actuating speed must therefore be defined in advance, so that the application pressure will be evaluated and determined only at suitable actuating speeds. The conditions existing upon release of the brake are shown in FIG. 4. FIG. 4a shows the brake command curve ($P_{soll}$, dash-dot line), the curve of the pressure in the control valve ($P_{valve}$, solid line), and the pressure in the brake cylinder ($P_{Bz}$, dotted line. When the brake pressure is to be decreased at the driver's command, air flows out of the brake cylinder via the control valve in correspondence with the input value and escapes to the outside. The pressure level in the brake cylinder thus decreases. When the brake is then released entirely at the driver's command (time $t_0$), the pressure gradient between the brake cylinder and the atmosphere is so small that the escape rate slows down considerably. When finally the pressure drops below the application pressure, the tensioning forces in the brake (e.g., the tension spring between the brake jaws) and the return spring in the brake cylinder start to push the air out of the brake cylinder. In this phase, the pressure remains nearly constant because of the resistances in the lines and at the control valve (time $t_0$). The last of the air escapes from the cylinder and the lines to the outside only as the piston in the brake cylinder comes up against its end stop. Another pressure sensor a certain distance away from the brake cylinder will measure a smaller pressure than that actually present in the brake cylinder. The difference between the two pressure values, however, can be determined by preliminary experiment and taken into account in the control unit for the storage of the application pressure value. In contrast to the behavior observed when the brake is actuated, the behavior observed when the air is escaping upon release of the brake is rather uniform for all release rates. It is therefore advantageous to determine the application pressure for the wheel brakes upon release of the brakes.

Figure 4B:
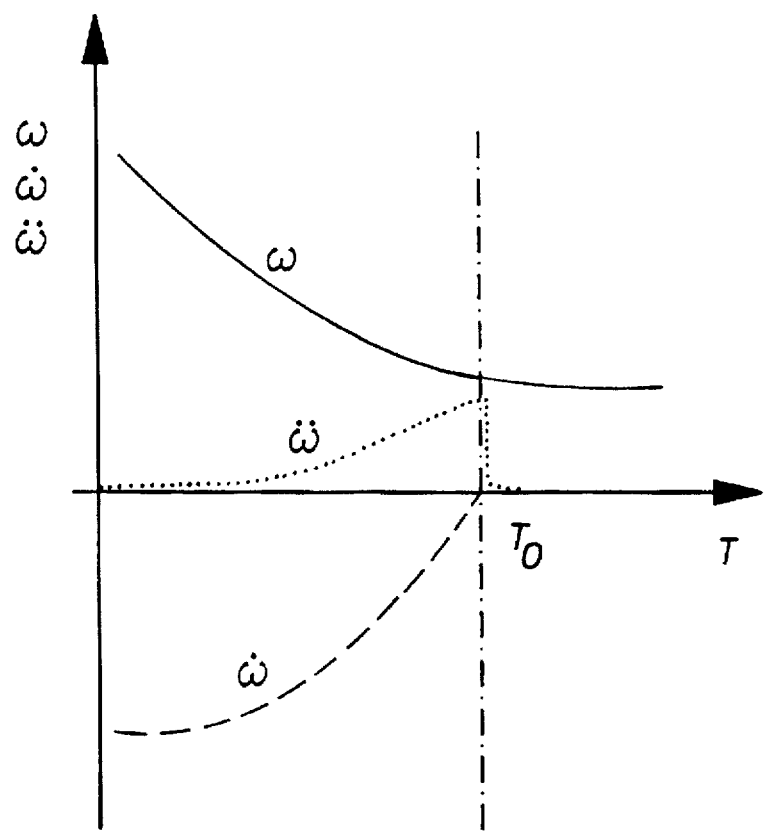

The rotational speed of the wheel shows the characteristic speed curves illustrated in FIG. 4b. Like FIG. 3b, FIG. 4b shows the rotational speed (solid line), its first derivative with respect to time (broken line), and its second derivative with respect to time (dotted line). It can be seen that, when the brake is released, the rotational speed of the wheel assumes, on transition from the decelerated state to the free-rolling state, an essentially uniform value (time $t_0$); that the first derivative with respect to time assumes a value near 0; and the second derivative with respect to time passes through a discontinuity. The evaluation of one or any combination of these characteristic curves can serve to detect the time of application $t_0$, i.e., the time at which the pressure value then present in the brake cylinder or at the control valve—under consideration of the difference between the two values—is stored as the application pressure $P_A$.

It has been found that it is advantageous to evaluate the release of the brake together with the actuation of the brake as a minimum procedure.

Because the application pressure does not change much over prolonged periods of time, allowable limit values for the application pressure are stored in the control unit. These are checked on determination of the application pressure, so that only physically plausible application pressures will be stored. In addition, the application pressure does not have to be evaluated and corrected each time that braking is done. An occasional automatic correction is sufficient. This correction can be carried out also as part of a diagnostic operation while the vehicle is being worked on in the garage.

Figure 5:
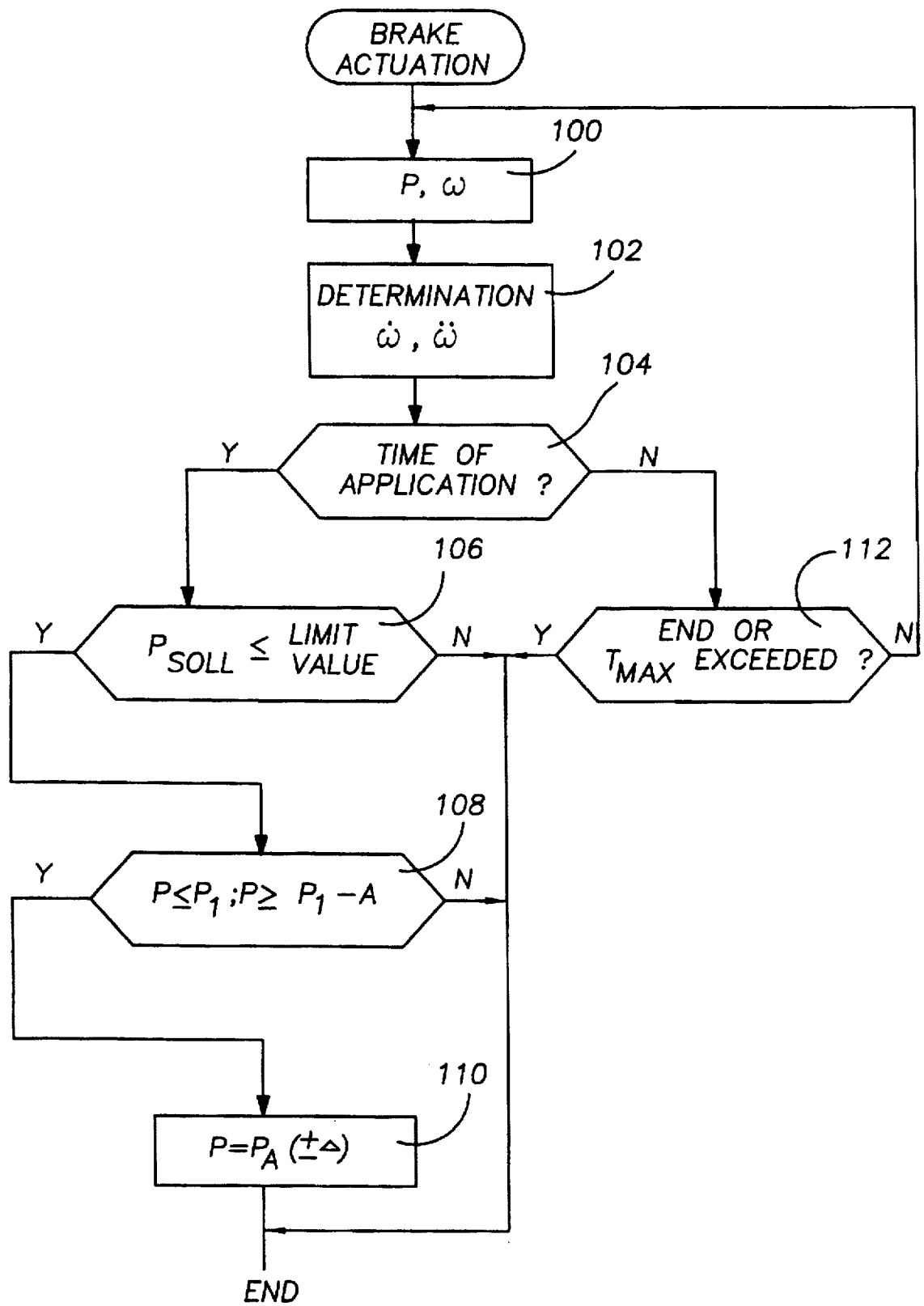
FIG. 5 shows a flow chart which is used to determine the application pressure upon actuation of the brake.

FIG. 5 shows a flow chart, which describes a computer program running in the control unit for determining the application pressure upon actuation of the brake. The section of the program shown in FIG. 5 starts to run when the brake is actuated, possibly under consideration of a time factor to prevent the program from running every time the brake is actuated. In another advantageous exemplary embodiment, this subprogram is started by external switching signals transmitted as part of a diagnostic operation. The program interprets a brake command different from zero as an actuation of the brake. The subprogram shown here describes the procedure which is used to determine the application pressure at one of the wheels. It is run again in the same way for each of the other wheels of the motor vehicle. Once the subprogram has started, the pressure value P prevailing at that moment and the rotational velocity ω of the wheel are accepted as input in the first step 100. Then, in input step 102, the first derivative of the rotational speed with respect to time and, in a preferred exemplary embodiment, the second derivative of the rotational speed with respect to time are determined from the current value of the rotational speed and a value detected in a previous runthrough of the program. In subsequent input step 104, then, on the basis of the values found for the derivatives or directly from the curve of the rotational speed signal versus time (e.g., from the difference between two successive speed values), the subprogram uses known mathematical methods and threshold comparisons to determine that the wheel is decelerating, that the first derivative has experienced a discontinuity, and/or that the second derivative has passed through a maximum. If one or if all these criteria are satisfied, then in input step 106 the program checks to see whether the brake actuation rate is in a suitable range of values for the determination of the application pressure. For this purpose, the derivative of the nominal pressure (or of the brake pedal position) with respect to time is compared with a predefined limit value. If it is below this limit value, the next input step 108 of the program checks to see whether the pressure detected in the current run of the program is within a predetermined range of values. If this is the case, in step 110 the current pressure is stored as the application pressure. This value is exact if the pressure is detected in the brake cylinder. If the pressure is detected near the control valve, the stored pressure value is corrected by a predetermined difference amount, which is a fixed value. In the case of a proportional valve, the value of the drive signal is accepted as input instead of a pressure; and, if the conditions of steps 104–108 are satisfied, the drive signal value present is stored in step 110. This section of the program ends after step 110.

If one of the conditions of input steps 106 and 108 is not satisfied, the subprogram is terminated. If, in input step 104, it is found that none of the criteria for determining the time of application is fulfilled, then, in input step 112, the program checks to see whether the actuation of the brake has ended or whether a maximum time for detecting the application pressure has run out. If this is the case, the subprogram ends; otherwise, it starts over again at step 100.

In the preferred exemplary embodiment, all conditions with respect to rotational speed and the first and second derivatives of the rotational speed with respect to time are checked jointly in input step 104. In other advantageous exemplary embodiments, two or only one of the criteria for determining the time of application can be checked.

Figure 6:
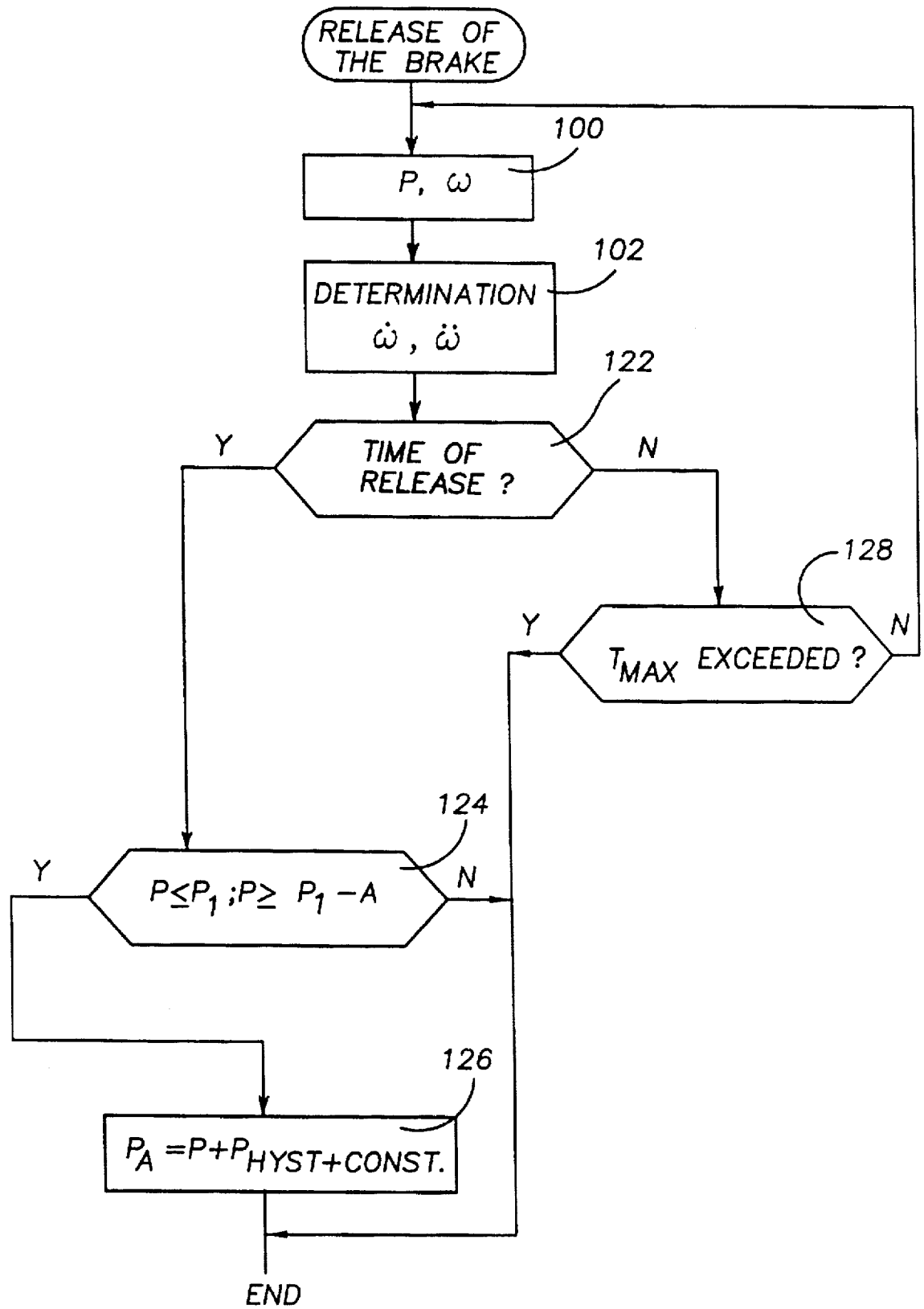
FIG. 6 shows a flow chart which is used to determine the application pressure upon release of the brake.

FIG. 6 shows a flow chart which describes a computer program for determining the application pressure upon release of the brake. Here it must be kept in mind that the application pressure value determined upon release of the brake is not the same as that determined upon application of the brake. On the contrary, a certain hysteresis gap separates the two values. Because the application pressure during the pressure buildup phase is more important for the control of the brake system, preliminary experiments are carried out to find an experimental value for this hysteresis, which can then be taken into account in the determination of the application pressure value upon release of the brake. Within the scope of the procedure described here, the hysteresis can also be arrived at by determining the application pressure upon release of the brake and upon its actuation and by determining the difference between these values, which is then accepted as the hysteresis value.

The subprogram shown in FIG. 6 is initiated upon release of the brake, that is, when the brake command assumes a value of zero. The subsequent program steps 100 and 102 are the same as those of the procedure according to FIG. 5 and are therefore not described in detail here in connection with FIG. 6. In step 122, the subprogram checks to see whether the time of application has been reached. To do this in the brake-release situation, the program checks the curve of the rotational speed of the wheel to determine if there is a transition between deceleration and the free-rolling condition, by checking the first derivative for a value in the range of zero, and/or by checking the second derivative for a discontinuity. If the criteria for recognizing the time of application are fulfilled, then according to step 124 the pressure value prevailing at this moment is checked to verify that it is within a reliable range of pressure values. If the pressure value is within this range, the current value P is stored in step 126 as the application pressure value $P_A$, under consideration of the predetermined hysteresis value $P_{hyst}$ with the correct sign, and possibly under consideration of the correction value required when the pressure is detected in the valve. Here, too, it is possible to use the drive signal of a proportional valve instead of the pressure signal. If the pressure value in step 124 is not in the predefined range or if the maximum time allowed for determining the time of application has expired without a determination (step 128), the program terminates.

What is claimed is:

1. Method for determining the application pressure of a brake mechanism of a vehicle, said method comprising braking at least one wheel of a vehicle by means of pressure acting on a brake mechanism, detecting a measure of the pressure in said brake mechanism, measuring the rotational speed of said at least one wheel and generating a rotational speed signal based on said speed, deriving a change over time of said rotational speed signal, detecting when a braking force at each wheel begins based on said change over time of said speed signal, determining the application pressure based on said measure of the pressure when the braking force begins, and correcting the pressure acting on said brake mechanism based on said application pressure.

2. Method for determining the application pressure of a brake mechanism of a vehicle, said method comprising braking at least one wheel of a vehicle by means of pressure acting on a brake mechanism, detecting a measure of the pressure in said brake mechanism, measuring the rotational speed of said at least one wheel and generating a rotational speed signal based on said speed, deriving a change over time of said rotational speed signal, detecting when a braking force at each wheel ends based on said change over time of said speed signal, determining the application pressure based on said measure of the pressure when the braking force ends, and correcting the brake pressure acting on said brake mechanism based on said application pressure.

3. Method according to claim 1 wherein said step of detecting when braking force at each wheel begins is based on an inflection in the course of said speed signal as pressure builds up when the brake is activated.

4. Method as in claim 1 wherein said step of deriving a change over time of said wheel speed signal comprises deriving at least one of a first and a second derivative with respect to time of said rotational speed signal, whereby said detecting when braking force at each wheel begins is based on at least one of said first derivative with respect to time and said second derivative with respect to time.

5. Method as in claim 4 wherein said detecting when braking force at each wheel begins is based on at least one of a discontinuity in the course of the first derivative of the speed signal with respect to time and a maximum value in the course of the second derivative of the speed signal with respect to time when the brake is activated.

6. Method as in claim 1 wherein said brake mechanism comprises a brake cylinder, said step of detecting a measure of the pressure comprising measuring said pressure in said brake cylinder, said step of determining the application pressure being based on the pressure in said brake cylinder and a correction value.

7. Method as in claim 1 wherein, during pressure buildup, the application pressure is determined only when the brake activation rate is in a predefined range of values and the pressure to be determined as the application pressure is within predefined limits.

8. Method as in claim 2 wherein said step of detecting when braking force ends is based on an inflection in the course of said speed signal as pressure decreases when the brake is released.

9. Method as in claim 2 wherein said step of deriving a change over time of a wheel speed signal comprises deriving at least one of a first and a second derivative with respect to time of said rotational speed signal, whereby said detecting when braking force at each wheel ends is based on at least one of said first derivative with respect to time and said second derivative with respect to time.

10. Method as in claim 9 wherein said detecting when braking force at each wheel ends is based on at least one of a value of about zero in the first derivative of the speed signal with respect to time and a discontinuity in the course of the second derivative of the speed signal with respect to time when the brake is released.

11. Method as in claim 2 wherein said application pressure is determined based on said measure of pressure when braking force ends and a hystersis value in order to obtain a pressure value which would be present as the application pressure when the brake is activated.

12. Method as in claim 2 wherein said brake mechanism comprises a brake cylinder, said step of detecting a measure of the brake pressure comprising measuring said pressure in said brake cylinder, said step of determining the brake pressure being based on the pressure in said brake cylinder and a correction value.

13. Method as in claim 2 wherein the application pressure is determined only when the pressure to be determined as the application pressure is within predefined limits values.

14. Method for determining the application pressure for a brake mechanism of a vehicle, said method comprising the steps of:

measuring the rotational speed of at least one of the wheels of the vehicle and generating a rotational speed signal based on the rotational speed;

deriving the change over time of the rotational speed signal;

determining the time of application of the brake mechanism from the change over time of the rotational speed signal;

detecting and measuring the pressure prevailing in the brake mechanism;

deriving the application pressure of the brake mechanism from the time of application of the brake mechanism.

15. Method as in claim 14 wherein said brake mechanism comprises a proportional valve which is activated by a drive signal, said application pressure being derived based on the drive signal at the time of application of the brake system.

16. Apparatus for determining the application pressure for a brake mechanism of a vehicle, said apparatus comprising means for detecting and measuring a pressure near the braking mechanism;

means for detecting and measuring the rotational speed of at least one of the wheels to be braked;

a control unit which derives a change over time of the rotational speed based on the rotational speed, derives a time of brake application based on said change over time, and derives the application pressure based on said measured pressure and said time.

* * * * *

UNITED STATES PATENT AND TRADEMARK OFFICE
CERTIFICATE OF CORRECTION

PATENT NO. : 5,720,534
DATED : February 24, 1998
INVENTOR(S) : Werner Stumpe

Page 1 of 1

It is certified that error appears in the above-identified patent and that said Letters Patent is hereby corrected as shown below:

Column 1,
Line 10, "maesuring" should be -- measuring --.

Signed and Sealed this

Nineteenth Day of February, 2002

Attest:

Attesting Officer

JAMES E. ROGAN
Director of the United States Patent and Trademark Office